(12) United States Patent
Zhu et al.

(10) Patent No.: US 11,256,075 B2
(45) Date of Patent: Feb. 22, 2022

(54) FREEFORM SURFACE OFF-AXIAL THREE-MIRROR IMAGING SYSTEM

(71) Applicants: Tsinghua University, Beijing (CN); HON HAI PRECISION INDUSTRY CO., LTD., New Taipei (TW)

(72) Inventors: Jun Zhu, Beijing (CN); Rui-rui Tang, Beijing (CN); Guo-Fan Jin, Beijing (CN); Shou-Shan Fan, Beijing (CN)

(73) Assignees: Tsinghua University, Beijing (CN); HON HAI PRECISION INDUSTRY CO., LTD., New Taipei (TW)

(*) Notice: Subject to any disclaimer, the term of this patent is extended or adjusted under 35 U.S.C. 154(b) by 349 days.

(21) Appl. No.: 16/502,147

(22) Filed: Jul. 3, 2019

(65) Prior Publication Data

US 2020/0241268 A1 Jul. 30, 2020

(30) Foreign Application Priority Data

Jan. 25, 2019 (CN) .......................... 201910075351.1

(51) Int. Cl.
*G02B 17/06* (2006.01)
*G02B 5/10* (2006.01)
*G02B 27/00* (2006.01)

(52) U.S. Cl.
CPC .......... *G02B 17/0642* (2013.01); *G02B 5/10* (2013.01); *G02B 17/0636* (2013.01); *G02B 27/0025* (2013.01)

(58) Field of Classification Search
CPC ..................... G02B 17/0642; G02B 17/0626
See application file for complete search history.

(56) References Cited

U.S. PATENT DOCUMENTS

| | | | | |
|---|---|---|---|---|
| 5,331,470 A * | 7/1994 | Cook | ................. | G02B 17/0657 359/859 |
| 5,550,672 A * | 8/1996 | Cook | ................. | G02B 17/0642 359/365 |
| 6,016,220 A * | 1/2000 | Cook | ................. | G02B 17/0642 359/351 |
| 7,177,076 B2 * | 2/2007 | Mann | ................. | G03F 7/70275 359/365 |
| 8,248,693 B2 * | 8/2012 | Cook | ..................... | G02B 5/006 359/399 |
| 8,469,528 B2 * | 6/2013 | Sakagami | ............ | G02B 7/1825 359/850 |
| 9,250,438 B2 | 2/2016 | Yang et al. | | |
| 9,268,122 B2 * | 2/2016 | Zhu | ..................... | G02B 17/0626 |
| 9,268,123 B2 * | 2/2016 | Zhu | ..................... | G02B 17/0642 |
| 9,405,109 B2 * | 8/2016 | Yang | .................. | G02B 17/0642 |
| 9,612,540 B2 * | 4/2017 | Patra | ................... | G03F 7/70075 |

(Continued)

FOREIGN PATENT DOCUMENTS

| | | |
|---|---|---|
| TW | 201523019 | 6/2015 |
| TW | 201837526 | 10/2018 |

*Primary Examiner* — Christopher Stanford
(74) *Attorney, Agent, or Firm* — ScienBiziP, P.C.

(57) ABSTRACT

A freeform surface off-axial three-mirror imaging system comprising a primary mirror, a secondary mirror, a tertiary mirror, and a detector. The secondary mirror defines a first location and a second location. Each reflective surface of the primary mirror, the secondary mirror and the tertiary mirror is an xy polynomial freeform surface. A working distance of the freeform surface off-axial three-mirror imaging system is greater than 125 mm.

19 Claims, 9 Drawing Sheets

(56) References Cited

U.S. PATENT DOCUMENTS

| | | | |
|---|---|---|---|
| 10,197,799 B2* | 2/2019 | Hou | G02B 27/0012 |
| 10,379,326 B2* | 8/2019 | Zhu | G02B 17/0626 |
| 10,386,619 B2* | 8/2019 | Zhu | G02B 27/0012 |
| 10,495,875 B2* | 12/2019 | Hou | G02B 27/0012 |
| 10,642,009 B2* | 5/2020 | Gong | G02B 5/10 |
| 10,642,010 B2* | 5/2020 | Zhu | G02B 17/0621 |
| 2008/0123205 A1* | 5/2008 | Nakano | G02B 17/0626 |
| | | | 359/859 |
| 2018/0164573 A1* | 6/2018 | Tetaz | G02B 27/0025 |

* cited by examiner

FIG. 9

FREEFORM SURFACE OFF-AXIAL THREE-MIRROR IMAGING SYSTEM

CROSS-REFERENCE TO RELATED APPLICATIONS

The application is also related to copending applications entitled, "METHOD FOR DESIGNING FREEFORM SURFACE OFF-AXIAL THREE-MIRROR IMAGING SYSTEM", filed Jul. 3, 2019 Ser. No. 16/502,148; "FREEFORM SURFACE OFF-AXIAL THREE-MIRROR IMAGING SYSTEM", filed Jul. 3, 2019 Ser. No. 16/502,138; "FREEFORM SURFACE OFF-AXIAL THREE-MIRROR IMAGING SYSTEM", filed Jul. 3, 2019 Ser. No. 16/502,144.

FIELD

The subject matter herein generally relates to freeform surface off-axial three-mirror imaging systems.

BACKGROUND

Compared with conventional rotationally symmetric surfaces, freeform surfaces have asymmetric surfaces and more degrees of design freedom, which can reduce the aberrations and simplify the structure of the system. In recent years, freeform surfaces are often used in off-axial three-mirror imaging system.

The conventional freeform surface off-axial three-mirror imaging systems are mainly designed for a certain distance object, that is, a working distance of a conventional freeform surface off-axial three-mirror imaging system cannot be changed, and when the working distance is changed, a high-resolution image cannot be obtained by the conventional freeform surface off-axial three-mirror imaging system.

BRIEF DESCRIPTION OF THE DRAWINGS

Implementations of the present technology will now be described, by way of embodiment, with reference to the attached figures, wherein.

DETAILED DESCRIPTION

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean "at least one."

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "contact" is defined as a direct and physical contact. The term "substantially" is defined to be that while essentially conforming to the particular dimension, shape, or other feature that is described, the component is not or need not be exactly conforming to the description. The term "comprising," when utilized, means "including, but not necessarily limited to"; it specifically indicates open-ended inclusion or membership in the so-described combination, group, series, and the like.

Figure 1:
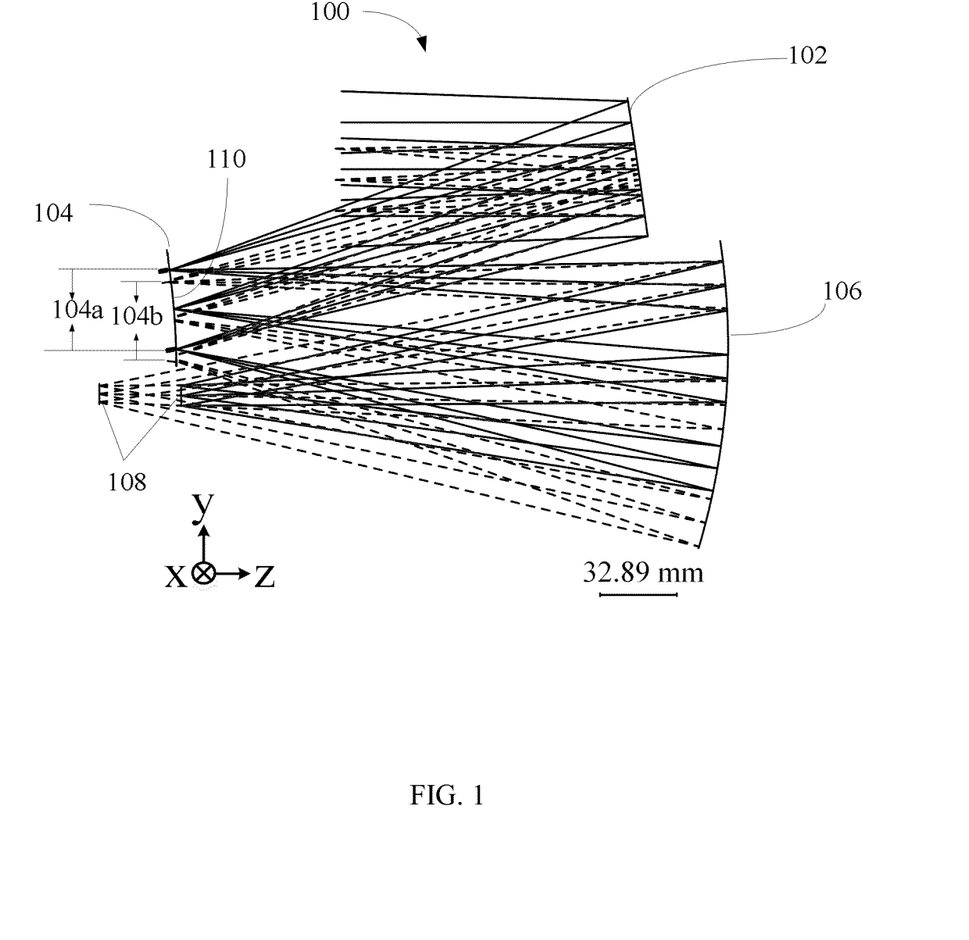
FIG. 1 is a light path schematic view of an embodiment of a freeform surface off-axis three-mirror imaging system.
Figure 2:
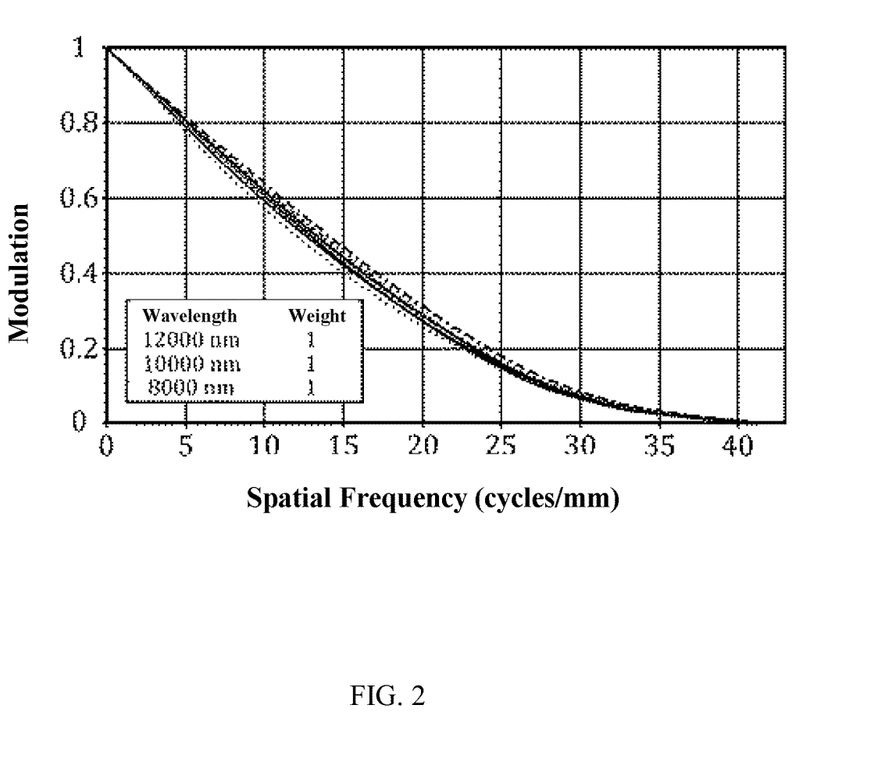
FIG. 2 shows a modulation-transfer-function (MTF) plot of an embodiment of a freeform surface off-axis three-mirror imaging system of one embodiment when an aperture is located at a first location and a working distance of the freeform surface off-axis three-mirror imaging system is infinity.
Figure 3:
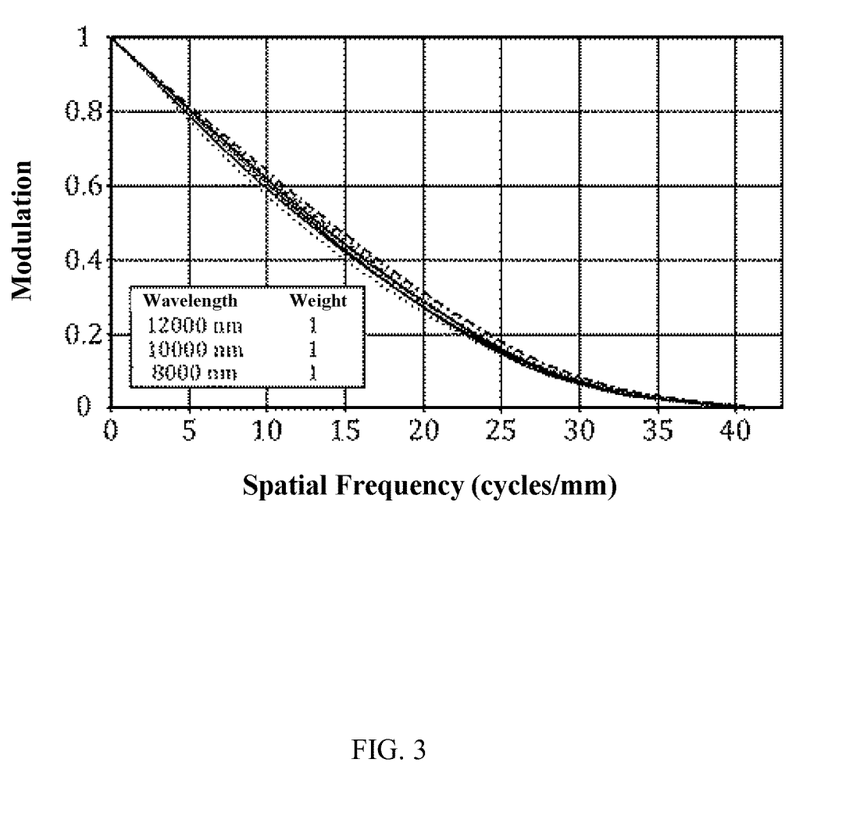
FIG. 3 shows a modulation-transfer-function (MTF) plot of a freeform surface off-axis three-mirror imaging system of one embodiment when an aperture is located at a first location and a working distance of the freeform surface off-axis three-mirror imaging system is 1000 mm.
Figure 4:
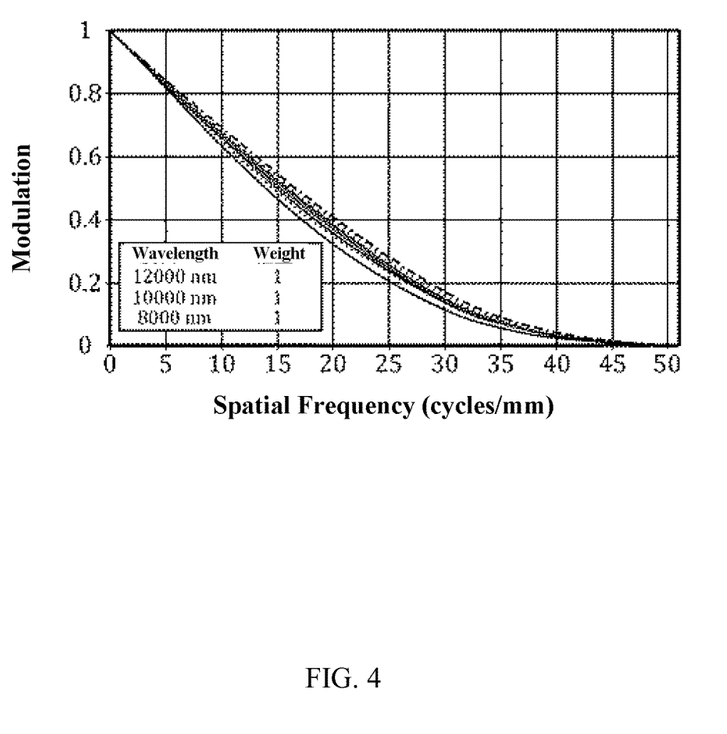
FIG. 4 shows a modulation-transfer-function (MTF) plot of a freeform surface off-axis three-mirror imaging system of one embodiment when an aperture is located at a second location and a working distance of the freeform surface off-axis three-mirror imaging system is 125 mm.
Figure 5:
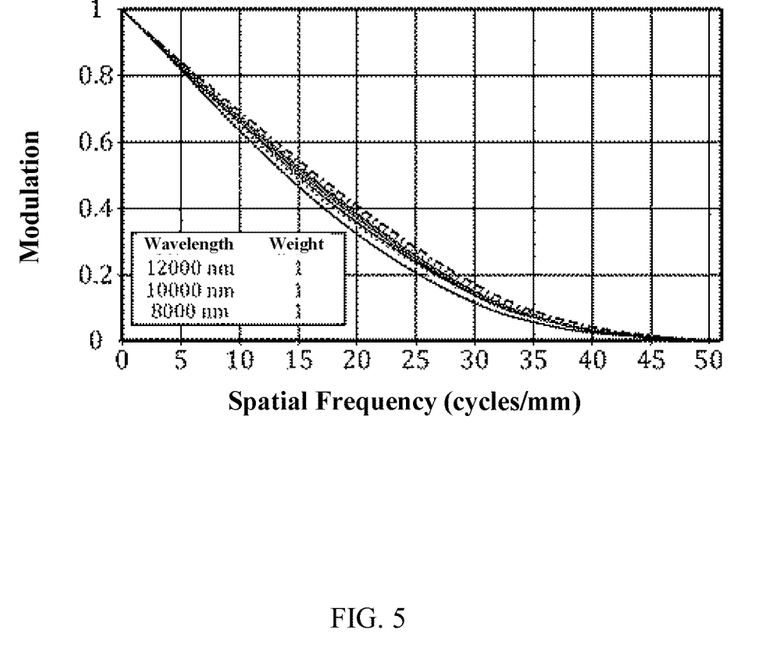
FIG. 5 shows a modulation-transfer-function (MTF) plot of a freeform surface off-axis three-mirror imaging system of one embodiment when an aperture is located at a second location and a working distance of the freeform surface off-axis three-mirror imaging system is 1000 mm.
Figure 6:
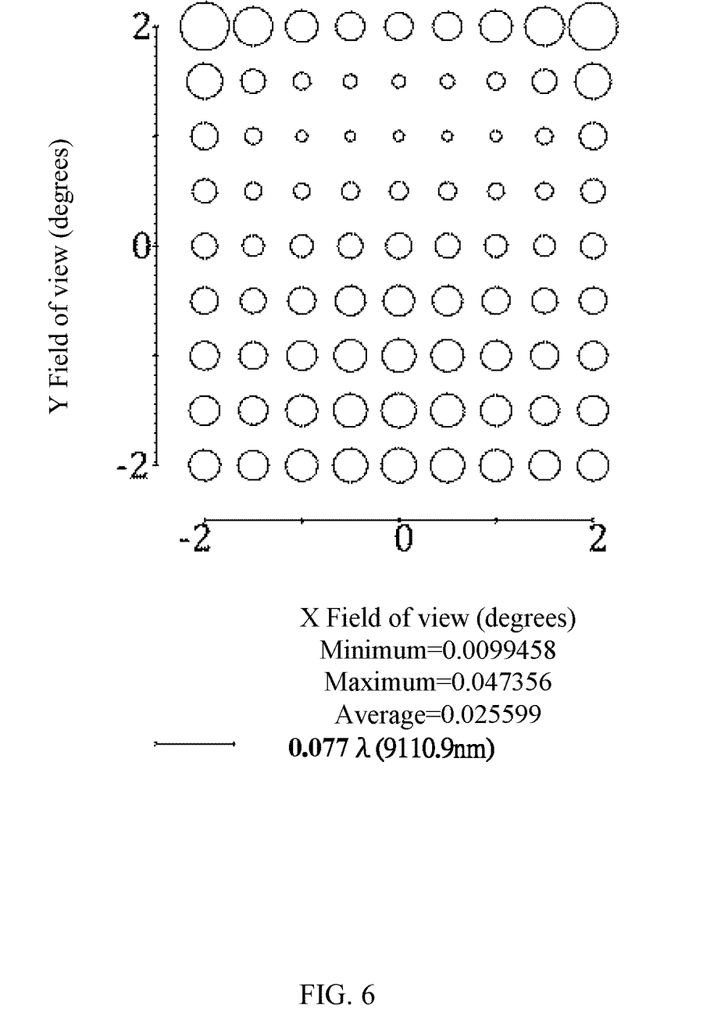
FIG. 6 shows a wave aberration diagram of an embodiment of a freeform surface off-axis three-mirror imaging system of one embodiment when an aperture is located at a first location and a working distance of the freeform surface off-axis three-mirror imaging system is infinity.
Figure 7:
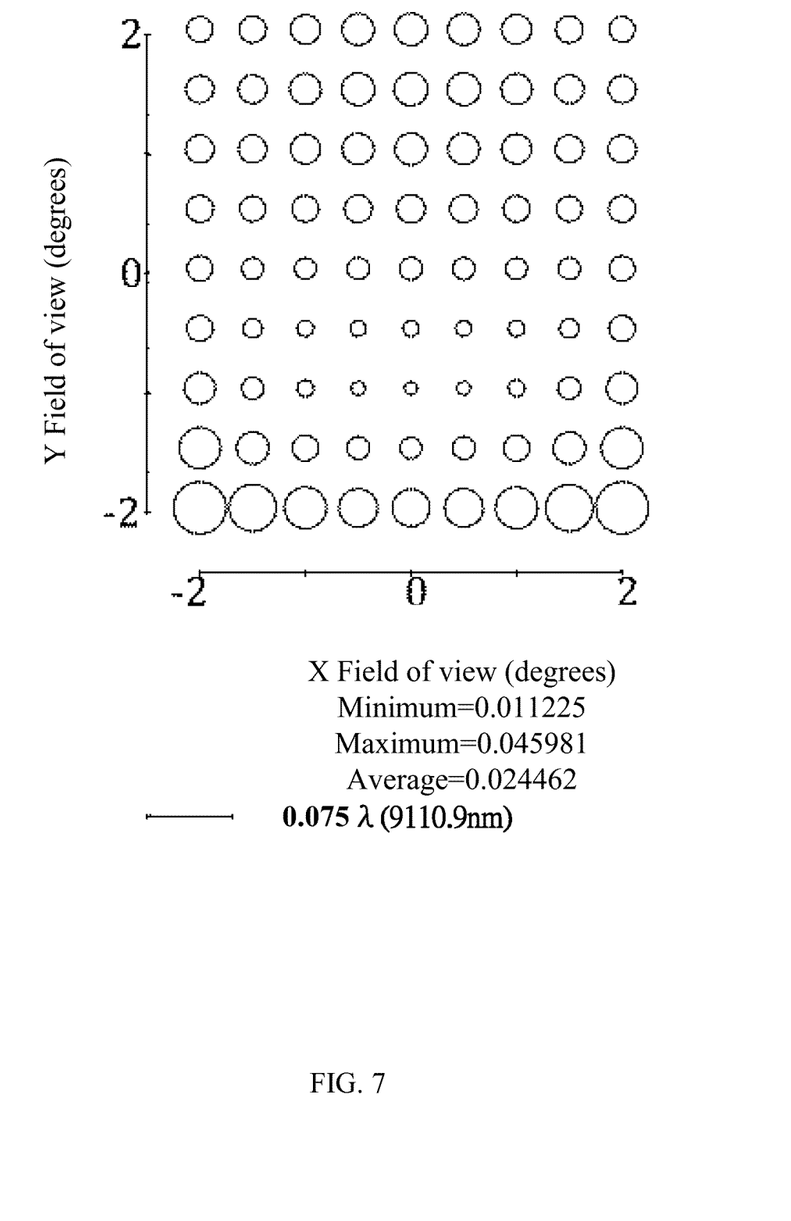
FIG. 7 shows a wave aberration diagram of an embodiment of a freeform surface off-axis three-mirror imaging system of one embodiment when an aperture is located at a first location and a working distance of the freeform surface off-axis three-mirror imaging system is 1000 mm.
Figure 8:
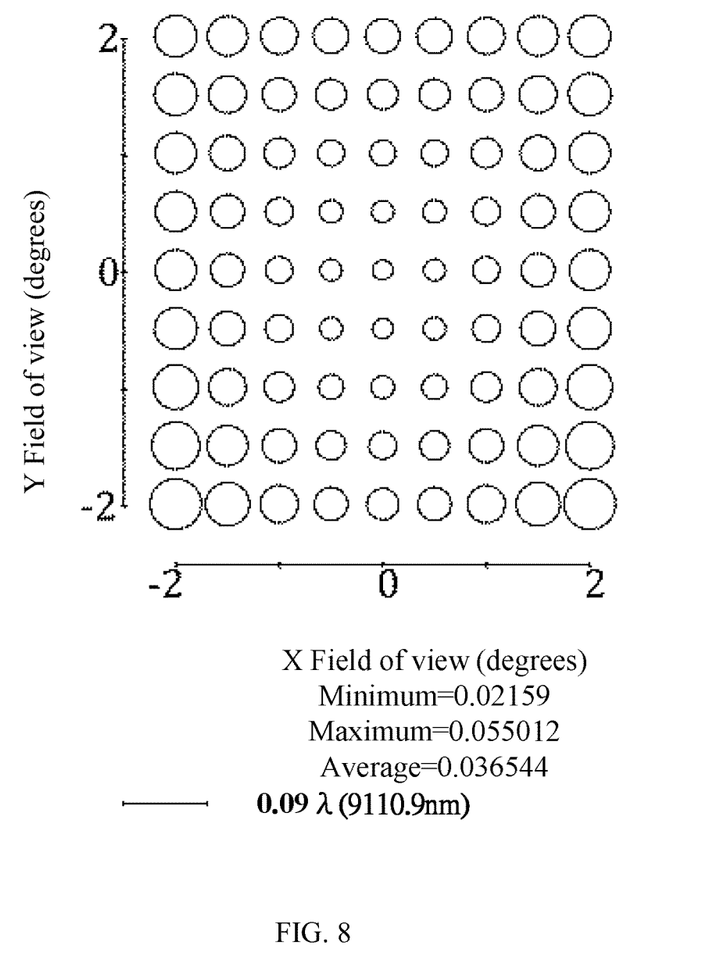
FIG. 8 shows a wave aberration diagram of an embodiment of a freeform surface off-axis three-mirror imaging system of one embodiment when an aperture is located at a second location and a working distance of the freeform surface off-axis three-mirror imaging system is 125 mm.
Figure 9:
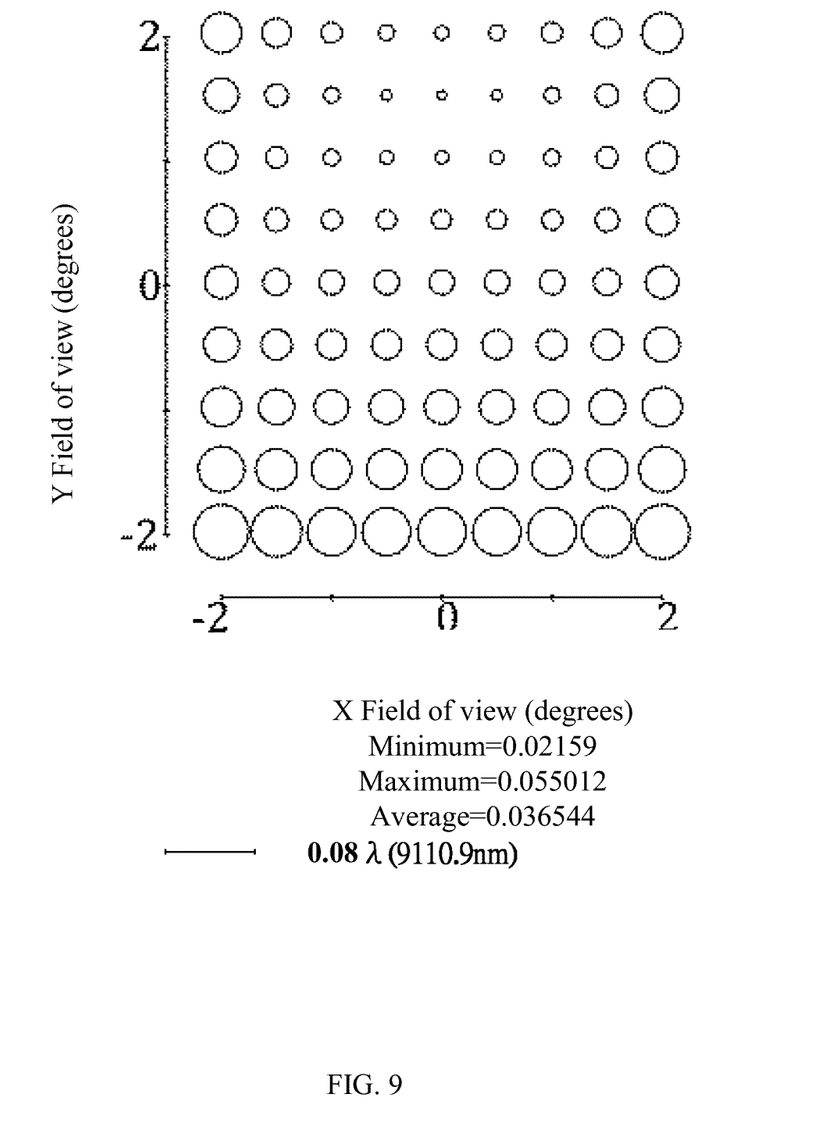
FIG. 9 shows a wave aberration diagram of an embodiment of a freeform surface off-axis three-mirror imaging system of one embodiment when an aperture is located at a second location and a working distance of the freeform surface off-axis three-mirror imaging system is 1000 mm.

Referring to FIG. 1, a freeform surface off-axial three-mirror imaging system 100 according to one embodiment is provided. The freeform surface off-axial three-mirror imaging system 100 comprises a primary mirror 102, a secondary mirror 104, an aperture 110, a tertiary mirror 106 and a detector 108. The secondary mirror 104 defines a first location 104a and a second location 104b different from the first location 104a. The aperture 110 is location on the secondary mirror 104. The aperture 110 is movable and capable of moving from the first location 104a to the second location 104b. A surface shape of each of the primary mirror 102, the secondary mirror 104, and the tertiary mirror 106 is a freeform surface. Feature rays exiting from a light source would be successively reflected by the primary mirror 102, the secondary mirror 104 and the tertiary mirror 106 to form an image on the detector 108.

A first three-dimensional rectangular coordinates system (X,Y,Z) is defined by a location of the primary mirror 102; a second three-dimensional rectangular coordinates system (X',Y',Z') is defined by a location of the secondary mirror 104; and a third three-dimensional rectangular coordinates system (X''',Y''',Z''') is defined by a location of the tertiary mirror 106.

A vertex of the primary mirror 102 is an origin of the first three-dimensional rectangular coordinates system (X,Y,Z). A horizontal line passing through the vertex of the primary mirror 102 is defined as an Z-axis; in the Z-axis, to the left is negative, and to the right is positive. A Y-axis is substantially perpendicular to the Z-axis and in a plane shown in FIG. 1; in the Y-axis, to the upward is positive, and to the downward is negative. An X-axis is substantially perpendicular to a YZ plane; in the X-axis, to the inside is positive, and to the outside is negative.

A reflective surface of the primary mirror 102 in the first three-dimensional rectangular coordinates system (X,Y,Z) is an xy polynomial freeform surface; and an xy polynomial equation can be expressed as follows:

$$z(x, y) = \frac{c(x^2 + y^2)}{1 + \sqrt{1 - (1+k)c^2(x^2 + y^2)}} + \sum_{i=1}^{N} A_i x^m y^n.$$

In the xy polynomial equation, z represents surface sag, c represents surface curvature, k represents conic constant, while $A_i$ represents the ith term coefficient. Since the freeform surface off-axial three-mirror imaging system 100 is symmetrical about a YOZ plane, so even order terms of x can be only remained. In one embodiment, the reflective surface of the primary mirror 102 is a fourth-order polynomial freeform surface of xy without odd items of x; and an equation of the fourth-order polynomial freeform surface of xy can be expressed as follows:

$$z(x, y) = \frac{c(x^2 + y^2)}{1 + \sqrt{1 - (1+k)c^2(x^2 + y^2)}} + A_2 y + A_3 x^2 + A_5 y^2 + A_7 x^2 y + A_9 y^3 + A_{10} x^4 + A_{12} x^2 y^2 + A_{14} y^4$$

In one embodiment, the values of c, k, and $A_i$ in the equation of the eighth-order polynomial freeform surface of xy of the reflective surface of the primary mirror 102 are listed in TABLE 1. However, the values of c, k, and $A_i$ in the eighth order xy polynomial equation are not limited to TABLE 1.

TABLE 1

| | |
|---|---|
| c | −1.3009059763E−03 |
| Conic Constant (k) | −2.0000000000E+01 |
| $A_2$ | 1.2938480415E+00 |
| $A_3$ | 3.0717782058E−04 |
| $A_5$ | −3.1635535631E−04 |
| $A_7$ | −5.7286094724E−07 |
| $A_9$ | −1.2681603156E−06 |
| $A_{10}$ | −3.7726207987E−09 |
| $A_{12}$ | −6.5376167661E−09 |
| $A_{14}$ | 1.0309091089E−08 |

A vertex of the secondary mirror 104 is an origin of the second three-dimensional rectangular coordinates system (X',Y',Z'). The second three-dimensional rectangular coordinates system (X',Y',Z') is obtained by moving the first three-dimensional rectangular coordinates system (X,Y,Z) along an Z-axis negative direction and a Y-axis positive direction. In one embodiment, The second three-dimensional rectangular coordinates system (X',Y',Z') is obtained by moving the first three-dimensional rectangular coordinates system (X,Y,Z) for about 135.424 mm along the Y-axis positive direction, and then moving for about 161.720 mm along the Z-axis negative direction, and then rotating along the counterclockwise direction for about 75.049° with the X axis as the rotation axis. A distance between the origin of the first three-dimensional rectangular coordinates system (X,Y,Z) and the origin of the second three-dimensional rectangular coordinates system (X',Y',Z') is about 210.934 mm.

In the second three-dimensional rectangular coordinates system (X',Y',Z'), a reflective surface of the first freeform surface 104a is an x'y' polynomial freeform surface. An x'y' polynomial surface equation can be expressed as follows:

$$z'(x', y') = \frac{c'(x'^2 + y'^2)}{1 + \sqrt{1 - (1+k')c'^2(x'^2 + y'^2)}} + \sum_{i=1}^{N} A'_i x'^m y'^m$$

In the x'y' polynomial freeform surface equation, z' represents surface sag, c' represents surface curvature, k' represents conic constant, while $A_i'$ represents the ith term coefficient. Since the freeform surface off-axial three-mirror imaging system 100 is symmetrical about Y'Z' plane, so even-order terms of x' can be only remained. At the same time, higher order terms will increase the fabrication difficulty of the freeform surface off-axial three-mirror imaging system 100. In one embodiment, the reflective surface of the first freeform surface 104a is a fourth-order polynomial freeform surface of x'y' without odd items of x'. An equation of the fourth-order polynomial freeform surface of x'y' can be expressed as follows:

$$z'(x', y) = \frac{c'(x'^2 + y'^2)}{1 + \sqrt{1 - (1+k')c'^2(x'^2 + y'^2)}} + A'_2 y' + A'_3 x'^2 + A'_5 y'^2 + A'_7 x'^2 y' + A'_9 y'^3 + A'_{10} x'^4 + A'_{12} x'^2 y'^2 + A'_{14} y'^4$$

In one embodiment, the values of c', k', and $A_i'$ in the equation of the eighth-order polynomial freeform surface of x'y' are listed in TABLE 2. However, the values of c', k', and $A_i'$ in the equation of the eighth-order polynomial freeform surface of x'y' are not limited to TABLE 2.

TABLE 2

| | |
|---|---|
| c' | −1.1915620077E−03 |
| Conic Constant (k') | 1.8829182944E+00 |
| $A_2'$ | −3.4056214544E−01 |
| $A_3'$ | −1.1650806184E−03 |
| $A_5'$ | −1.3039278864E−03 |
| $A_7'$ | −4.9583457520E−06 |

TABLE 2-continued

| | |
|---|---|
| $A_9'$ | −5.4331375863E−06 |
| $A_{10}'$ | −3.6431899073E−08 |
| $A_{12}'$ | −9.7220800037E−08 |
| $A_{14}'$ | −5.5011438487E−08 |

The aperture 110 includes a circular through hole with a radius of about 10.576 mm. The feature rays exiting from the light source are reflected by the primary mirror 102, and pass through the aperture 110 then are reflected by the secondary mirror 104. Please referring to FIG. 1, a center of the first location 104a is located in the center of the second three-dimensional rectangular coordinates system (X',Y',Z'); a center of the second location 104b is obtained by moving the center of the first location 104a along Y'-axis negative direction for about 5 mm. When the aperture 110 is located at the first location 104a, the working distance of the freeform surface off-axial three-mirror imaging system 100 is greater than 1000 mm; when the aperture 110 is located at the second location 104b, the working distance of the freeform surface off-axial three-mirror imaging system 100 is in a range from 125 mm to 1000 mm.

A vertex of the tertiary mirror 106 is an origin of the third three-dimensional rectangular coordinates system (X",Y",Z"). The third three-dimensional rectangular coordinates system (X",Y",Z") is obtained by moving the second three-dimensional rectangular coordinates system (X',Y',Z') along an Z'-axis positive direction and a Y'-axis positive direction. In one embodiment, the third three-dimensional rectangular coordinates system (X",Y",Z") is obtained by moving the second three-dimensional rectangular coordinates system (X',Y',Z') for about 38.638 mm along a Y'-axis positive direction, and then moving for about 235.432 mm along an Z'-axis negative direction, and then rotating along the counterclockwise direction for about 12.0439° with the X' axis as the rotation axis. A distance between the origin of the second three-dimensional rectangular coordinates system (X',Y',Z') and the origin of the third three-dimensional rectangular coordinates system (X",Y",Z") is about 238.58 mm.

In the third three-dimensional rectangular coordinates system (X",Y",Z"), a reflective surface of the tertiary mirror 106 is an x"y" polynomial freeform surface. An x"y" polynomial surface equation can be expressed as follows:

$$z''(x'', y'') = \frac{c''(x''^2 + y''^2)}{1 + \sqrt{1 - (1 + k'')c''^2(x''^2 + y''^2)}} + \sum_{i=1}^{N} A_i'' x''^m y''^n$$

In the x"y" polynomial freeform surface equation, z" represents surface sag, c" represents surface curvature, k" represents conic constant, while $A_i''$ represents the ith term coefficient. Since the freeform surface off-axial three-mirror imaging system 100 is symmetrical about Y"Z" plane, so even-order terms of x" can be only remained. At the same time, higher order terms will increase the fabrication difficulty of the freeform surface off-axial three-mirror imaging system 100. In one embodiment, the reflective surface of the tertiary mirror 106 is a fourth-order polynomial freeform surface of x"y" without odd items of x". An equation of the fourth-order polynomial freeform surface of x"y" can be expressed as follows:

$$z''(x'', y'') = \frac{c''(x''^2 + y''^2)}{1 + \sqrt{1 - (1 + k'')c''^2(x''^2 + y''^2)}} + A_2'' y'' + A_3'' x''^2 + A_5'' y''^2 + A_7'' x''^2 y'' + A_9'' y''^3 + A_{10}'' x''^4 + A_{12}'' x''^2 y''^2 + A_{14}'' y''^4$$

In one embodiment, the values of c", k", and $A_i''$ in the equation of the eighth-order polynomial freeform surface of x"y" are listed in TABLE 3. However, the values of c", k", and $A_i''$ in the equation of the eighth-order polynomial freeform surface of x"y" are not limited to TABLE 3.

TABLE 3

| | |
|---|---|
| c" | −5.5456205145E−03 |
| Conic Constant (k") | −7.7833666336E−01 |
| $A_2''$ | −2.1856920708E−02 |
| $A_3''$ | 1.1047186045E−03 |
| $A_5''$ | 1.1128699536E−03 |
| $A_7''$ | −1.0894003622E−07 |
| $A_9''$ | −1.0926364274E−07 |
| $A_{10}''$ | −4.4210585332E−10 |
| $A_{12}''$ | −9.0452404064E−10 |
| $A_{14}''$ | −3.9251716219E−10 |

The materials of the primary mirror 102, the secondary mirror 104 and the tertiary mirror 106 can be aluminum, beryllium or other metals. The materials of the primary mirror 102, the secondary mirror 104 and the tertiary mirror 106 can also be silicon carbide, quartz or other inorganic materials. A reflection enhancing coating can also be coated on the metals or inorganic materials to enhance the reflectivity performance of the three mirrors. In one embodiment, the reflection enhancing coating is a gold film. A size of each of the primary mirror 102, the secondary mirror 104 and the tertiary mirror 106 can be designed according to actual needs.

The feature rays exiting from the light source are reflected by the primary mirror 102, pass through the aperture 110 to get on the secondary mirror 104, and then are reflected by the secondary mirror 104 and the tertiary mirror 106 to form an image on the detector 108. A location of the detector 108 is movable according to the location of the aperture 110. Referring to FIG. 1, when the aperture 110 is at the first location 104a, the position of the detector 108 is closer to the tertiary mirror 106 in a plane perpendicular to the X"-axis in the third three-dimensional rectangular coordinates system (X",Y",Z"). In the third three-dimensional rectangular coordinates system (X",Y",Z"), a distance along the Z"-axis negative direction between a center of the detector 108 and the vertex of the tertiary mirror 106 is about 233.880 mm. The center of the detector 108 deviates from the Z''' axis in the negative direction of the Y''' axis, and a deviation is about 25.608 mm. An angle of the detector with the X'''Y''' plane in the clockwise direction is about 3.001°. When the aperture 110 is at the second location 104b, the position of the detector 108 is farther away the tertiary mirror 106 in a plane perpendicular to the X"-axis in the third three-dimensional rectangular coordinates system (X",Y",Z"). In the third three-dimensional rectangular coordinates system (X",Y",Z"), a distance along the Z"-axis negative direction between a center of the detector 108 and the vertex of the tertiary mirror 106 is about 265.179 mm. The center of the detector 108 deviates from the Z''' axis in the negative direction of the Y''' axis, and a deviation is about 26.134 mm. An angle of the detector with the X'''Y''' plane in the clockwise direction is about 1.740°. A size of the detector 108 can be selected according to actual needs.

An effective entrance pupil diameter of the freeform surface off-axial three-mirror imaging system 100 is about 40 mm.

The freeform surface off-axial three-mirror imaging system 100 adopts an off-axis field of view in meridian direction. In one embodiment, a range of the field of view is 4°×4°, wherein the range of the field of view in the sagittal direction is −2° to 2°, the range of the field of view in the meridional direction is −2° to 2°, the FOL is 120 mm.

A wavelength of the freeform surface off-axial three-mirror imaging system 100 is not limited, in one embodiment, the wavelength of the freeform surface off-axial three-mirror imaging system 100 is from about 8000 nm to about 12000 nm.

In one embodiment, the F-number of the freeform surface off-axial three-mirror imaging system 100 is 3, and the relative aperture size D/f is the reciprocal of the F-number, that is, the relative pore size D/f is 0.333.

A modulation transfer functions (MTF) of the freeform surface off-axial three-mirror imaging system 100 in visible band of different working states with different working distance is separately shown in FIGS. 2-5. In different working states, the detector 108 moves to a corresponding focus position. It can be seen from FIGS. 2-5. under the four working states, the MTF curve at each working distance basically reaches the diffraction limit, which indicates that, the freeform surface off-axial three-mirror imaging system 100 has a high imaging quality. From the above analysis, it is clear that, when the aperture 110 is at the first location 104a, the freeform surface off-axial three-mirror imaging system 100 can obtain high-resolution imaging of an object with a distance ranged from 1000 mm to infinity; when the aperture 110 is at the second location 104b, the freeform surface off-axial three-mirror imaging system 100 can obtain high-resolution imaging of an object with a distance ranged from 125 mm to 1000 mm.

FIGS. 6-9 superlatively shows a wave aberration diagram of an embodiment of the freeform surface off-axis three-mirror imaging system 100 in the four working states. In different working states, the detector 108 moves to a corresponding focus position. In the four different working states shown in FIGS. 6-9, the average value of the wave aberration is less than 0.037λ, where λ=9110.9 nm. The imaging quality of the freeform surface off-axis three-mirror imaging system 100 is good.

The freeform off-axis three-mirror imaging system 100 provided by the present invention adopts an off-axis three-reverse system, and has no central obscuration. The working distance of the freeform off-axis three-mirror imaging system 100 is greater than 125 mm, and has a large working range. The freeform off-axis three-mirror imaging system 100 has an F-number of 3, which enable the freeform off-axis three-mirror imaging system 100 has a high-resolution image. Further, the structure of the freeform off-axis three-mirror imaging system 100 is compact.

The applications of the freeform surface off-axial three-mirror imaging system 100 comprises earth observation, space target detection, astronomical observations, Multi-spectral thermal imaging, and dimensional mapping.

Depending on the embodiment, certain blocks/steps of the methods described may be removed, others may be added, and the sequence of blocks may be altered. It is also to be understood that the description and the claims drawn to a method may comprise some indication in reference to certain blocks/steps. However, the indication used is only to be viewed for identification purposes and not as a suggestion as to an order for the blocks/steps.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A freeform surface off-axial three-mirror imaging system, comprising:

a primary mirror, wherein a first three-dimensional rectangular coordinates system (X,Y,Z) is defined with a vertex of the primary mirror as a first origin, and in the first three-dimensional rectangular coordinates system (X,Y,Z), a reflective surface of the primary mirror is an xy polynomial freeform surface;

a secondary mirror, wherein a second three-dimensional rectangular coordinates system (X',Y',Z') is defined with a vertex of the second mirror as a second origin, and the second three-dimensional rectangular coordinates system (X',Y',Z') is obtained by moving the first three-dimensional rectangular coordinates system (X,Y,Z) along an Z-axis negative direction and a Y-axis positive direction, and in the second three-dimensional rectangular coordinates system (X',Y',Z'), a reflective surface of the secondary mirror is an x'y' polynomial freeform surface, the secondary mirror defining a first location and a second location;

an aperture being capable of moving between the first location and the second location;

a tertiary mirror, wherein a third three-dimensional rectangular coordinates system (X",Y",Z") is defined with a vertex of the tertiary mirror as a third origin, and the third three-dimensional rectangular coordinates system (X",Y",Z") is obtained by moving the second three-dimensional rectangular coordinates system (X',Y',Z') along an Z'-axis positive direction and a Y'-axis positive direction, and in the third three-dimensional rectangular coordinates system (X",Y",Z"), a reflective surface of the tertiary mirror is an x"y" polynomial freeform surface;

a detector, wherein feature rays are reflected by the primary mirror, the secondary mirror and the tertiary mirror to form an image on the detector;

wherein a working distance of the freeform surface off-axial three-mirror imaging system is greater than 125 mm.

2. The freeform surface off-axial three-mirror imaging system of claim 1, wherein the second three-dimensional rectangular coordinates system (X',Y',Z') is offset from the first three-dimensional rectangular coordinates system (X,Y,Z) by approximately 135.424 mm along the Y-axis positive direction, and offset from the first three-dimensional rectangular coordinate system (X,Y,Z) by approximately 161.720 mm along the Z-axis negative direction, and then rotating along the counterclockwise direction for approximately 75.049° with the X axis as the rotation axis.

3. The freeform surface off-axial three-mirror imaging system of claim 1, wherein a distance between the origin of the first three-dimensional rectangular coordinates system (X,Y,Z) and the origin of the second three-dimensional rectangular coordinates system (X',Y',Z') is approximately 210.934 mm.

4. The freeform surface off-axial three-mirror imaging system of claim 1, wherein the third three-dimensional rectangular coordinates system (X",Y",Z") is offset from the second three-dimensional rectangular coordinates system (X',Y',Z') by approximately 38.638 mm along a Y'-axis positive direction, and offset from the first three-dimensional rectangular coordinate system (X,Y,Z) by approximately 235.432 mm along an Z'-axis positive direction, and then rotating along the counterclockwise direction for approximately 12.0439° with the X' axis as the rotation axis.

5. The freeform surface off-axial three-mirror imaging system of claim 1, wherein a distance between the origin of the second three-dimensional rectangular coordinates system (X',Y',Z') and the origin of the third three-dimensional rectangular coordinates system (X",Y",Z") is approximately 238.58 mm.

6. The freeform surface off-axial three-mirror imaging system of claim 1, wherein the reflective surface of the primary mirror is a fourth-order polynomial freeform surface of xy without odd items of x; and an equation of the eighth-order polynomial freeform surface of xy is expressed as follows:

$$z(x, y) = \frac{c(x^2 + y^2)}{1 + \sqrt{1 - (1+k)c^2(x^2 + y^2)}} + A_2 y +$$
$$A_3 x^2 + A_5 y^2 + A_7 x^2 y + A_9 y^3 + A_{10} x^4 + A_{12} x^2 y^2 + A_{14} y^4$$

wherein z represents surface sag, c represents surface curvature, k represents conic constant, and $A_i$ represents the ith term coefficient.

7. The freeform surface off-axial three-mirror imaging system of claim 6, wherein

| |
| --- |
| c = −1.3009059763E−03, k = −2.0000000000E+01, $A_2$ = 1.2938480415E+00, |
| $A_3$ = 3.0717782058E−04, $A_5$ = −3.1635535631E−04, $A_7$ = −5.7286094724E−07, |
| $A_9$ = −1.2681603156E−06, $A_{10}$ = −3.7726207987E−09, $A_{12}$ = −6.5376167661E−09, |
| $A_{14}$ = 1.0309091089E−08. |

8. The freeform surface off-axial three-mirror imaging system of claim 1, wherein in the second three-dimensional rectangular coordinates system (X',Y',Z'), the reflective surface of the secondary mirror is a fourth-order polynomial freeform surface of x'y' without odd items of x', and an equation of the eighth-order polynomial freeform surface of x'y' is:

$$z'(x', y') = \frac{c'(x'^2 + y'^2)}{1 + \sqrt{1 - (1+k')c'^2(x'^2 + y'^2)}} +$$
$$A'_2 y' + A'_3 x'^2 + A'_5 y'^2 + A'_7 x'^2 y' + A'_9 y'^3 +$$
$$A'_{10} x'^4 + A'_{12} x'^2 y'^2 + A'_{14} y'^4,$$

wherein z' represents surface sag, c' represents surface curvature, k' represents conic constant, and $A_i'$ represents the ith term coefficient.

9. The freeform surface off-axial three-mirror imaging system of claim 8, wherein

| |
| --- |
| c' = −1.1915620077E−03, k' = 1.8829182944E+00, |
| $A_2'$ = −3.4056214544E−01, $A_3'$ = −1.1650806184E−03, |
| $A_5'$ = −1.3039278864E−03, $A_7'$ = −4.9583457520E−06, |
| $A_9'$ = −5.4331375863E−06, $A_{10}'$ = −3.6431899073E−08, |
| $A_{12}'$ = −9.7220800037E−08, $A_{14}'$ = −5.5011438487E−08. |

10. The freeform surface off-axial three-mirror imaging system of claim 1, wherein in the third three-dimensional rectangular coordinates system (X",Y",Z"), the reflective surface of the tertiary mirror is a fourth-order polynomial freeform surface of x"y" without odd items of x", and an equation of the eighth-order polynomial freeform surface of x"y" is $$z''(x'', y'') = \frac{c''(x''^2 + y''^2)}{1 + \sqrt{1 - (1+k'')c''^2(x''^2 + y''^2)}} + A_2'' y'' + A_3'' x''^2 +$$
$$A_5'' y''^2 + A_7'' x''^2 y'' + A_9'' y''^3 + A_{10}'' x''^4 + A_{12}'' x''^2 y''^2 + A_{14}'' y''^4$$

wherein z" represents surface sag, c" represents surface curvature, k" represents conic constant, and $A_i''$ represents the ith term coefficient.

11. The freeform surface off-axial three-mirror imaging system of claim 10, wherein $c'' = -1.7198715496\text{E}-03$, $k'' = -2.0000000000\text{E}+01$, $A_2'' = -2.8476156510\text{E}-01$, $A_3'' = -8.1816431466\text{E}-06$, $A_5'' = -6.1295856898\text{E}-04$, $A_7'' = 2.4682320767\text{E}-05$, $A_9'' = 1.1543822730\text{E}-05$, $A_{10}'' = -2.9325409902\text{E}-08$, $A_{12}'' = -6.4494233230\text{E}-08$, $A_{14}'' = -3.9424838348\text{E}-08$, $A_{16}'' = 7.3676644654\text{E}-11$, $A_{18}'' = -1.6543729895\text{E}-10$.

12. The freeform surface off-axial three-mirror imaging system of claim 1, wherein the aperture comprises a circular through hole with a radius of approximately 10.576 mm.

13. The freeform surface off-axial three-mirror imaging system of claim 1, wherein a center of the first location is located in the center of the second three-dimensional rectangular coordinates system (X',Y',Z'); a center of the second location is offset from the center of the first location along Y'-axis negative direction for approximately 5 mm.

14. The freeform surface off-axial three-mirror imaging system of claim 1, wherein the aperture is located at the first location, the working distance of the freeform surface off-axial three-mirror imaging system is greater than 1000 mm.

15. The freeform surface off-axial three-mirror imaging system of claim 1, wherein the aperture is located at the second location, the working distance of the freeform surface off-axial three-mirror imaging system is in a range from 125 mm to 1000 mm.

16. The freeform surface off-axial three-mirror imaging system of claim 1, wherein an effective entrance pupil diameter of a field of view passage of the freeform surface off-axial three-mirror imaging system is approximately 40 mm.

17. The freeform surface off-axial three-mirror imaging system of claim 1, wherein the first effective focal length is 120 mm.

18. The freeform surface off-axial three-mirror imaging system of claim 1, wherein a range of a field of view is 4°×4°.

19. The freeform surface off-axial three-mirror imaging system of claim 18, wherein the range of the field of view in the sagittal direction is −2° to 2°, a range of the field of view in the meridional direction is −2° to 2°.

* * * * *